United States Patent

[11] 3,575,667

| | | |
|---|---|---|
| [72] | Inventor | Peter W. Smith<br>Little Silver, N.J. |
| [21] | Appl. No. | 656,473 |
| [22] | Filed | July 27, 1967 |
| [45] | Patented | Apr. 20, 1971 |
| [73] | Assignee | Bell Telephone Laboratories, Incorporated<br>Murray Hill, Berkeley Heights, N.J. |

[54] SINGLE MODE RING LASER
4 Claims, 1 Drawing Fig.

[52] U.S. Cl. .................................................. 331/94.5,
356/106
[51] Int. Cl. .................................................... H01s 3/05
[50] Field of Search ......................................... 331/94.5;
356/106

[56]      References Cited
UNITED STATES PATENTS

| 3,134,837 | 5/1964 | Kislink et al. ................ | 331/94.5 |
| 3,187,270 | 6/1965 | Kozelnik et al. ............... | 331/94.5 |
| 3,332,314 | 7/1967 | Rosenthal ...................... | 356/106 |
| 3,395,367 | 7/1968 | Bell et al. ....................... | 331/94.5 |

*Primary Examiner*—Ronald L. Wibert
*Assistant Examiner*—Edward S. Bauer
*Attorneys*—R. J. Guenther and Arthur J. Torsiglieri ABSTRACT: A highly mode-selective ring laser is made with primary and auxiliary ring resonators that are coupled through beam splitters that direct out of the laser a large portion of radiation in modes that are not resonant in both of the resonators. Typically, the beam splitters will operate on modes propagating in opposite senses. A typical configuration includes primary and auxiliary ring resonators both in the form of quadrilaterals and includes beam splitters with reflectivities chosen to provide a loss for the nonselected modes that is higher than the gain of the laser.

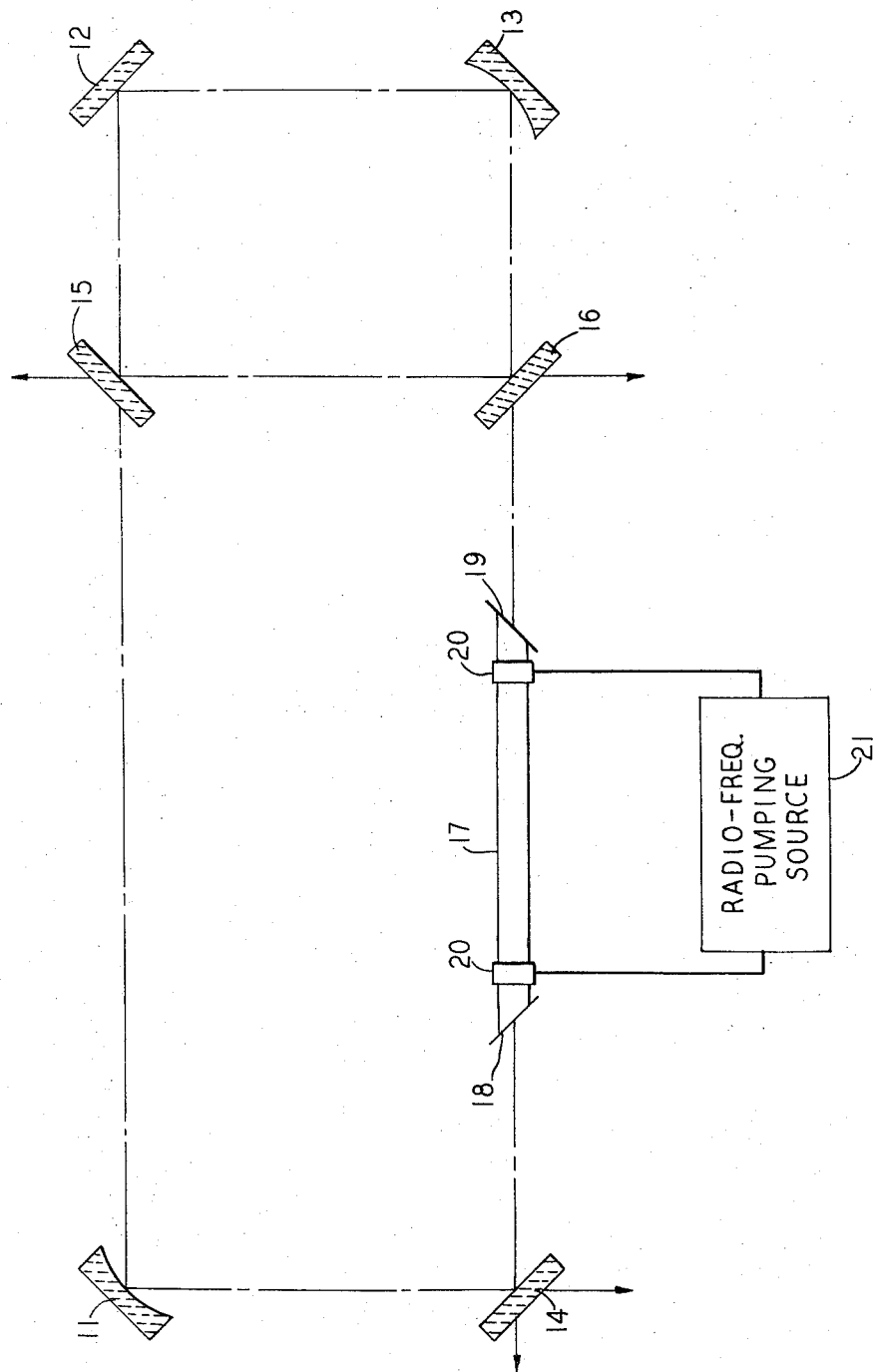

SINGLE MODE RING LASER

BACKGROUND OF THE INVENTION

This invention relates to mode-selective resonators for lasers, especially ring lasers.

Mode selection has been a prime area for research effort and problem solving from the beginning of the laser art because laser resonators are many wavelengths long and wide and will support many longitudinal and transverse modes. A mode is a pattern of electromagnetic wave energy having nodes and antinodes that are essentially stable in the sense that they remain fixed in space or travel in a predictable manner. A node is a point of zero electric field intensity; and an antinode is a point of maximum value of electric field intensity. A longitudinal mode is a pattern of spacing of such nodes and antinodes along the axis of a laser resonator; and a transverse mode is a pattern of spacing of such nodes and antinodes transverse to the laser axis. The reason that mode selection, especially longitudinal mode selection, has received much attention is that information modulation is most easily imparted to a laser beam if most of its power is contained in a single longitudinal mode.

While many schemes have been proposed for improving the mode selectivity of laser resonators, many are not efficient in producing high-power, single-frequency output because they have relatively broad filter characteristics. Further, as path length in the resonator increases, ever sharper filtering characteristics are required for an effective mode-selective laser resonator.

The need for a mode-selective ring laser is heightened by the fact that ring lasers can sometimes provide higher power output and more efficient operation than can be readily obtained from the same active media in the so-called linear resonator configurations. An explanation of such advantages of ring lasers can be found in the copending Pat. application of W. W. Rigrod, Ser. No. 516,867, now U.S. Pat. No. 3,466,565, filed Dec. 28, 1965, and assigned to the assignee hereof.

In order to realize these advantages more fully, it would be desireable to provide a mode-selective ring laser configuration with improved filtering characteristics.

SUMMARY OF THE INVENTION

According to my invention, a mode-selective ring laser having the desired properties is obtained by coupling primary and auxiliary ring resonators through two independent beam splitters, which are oriented to direct out of the laser all modes that are not resonant in both resonators. For example, one will obliquely reflect out of the laser the nonresonant clockwise-propagating modes; and the other, the nonresonant counterclockwise-propagating modes.

BRIEF DESCRIPTION OF THE DRAWING

Further features and advantages of the invention will become apparent from the following detailed description taken together with the drawing in which the sole FIGURE is a partially pictorial, partially block diagrammatic illustration of an illustrative embodiment of the invention.

DESCRIPTION OF THE ILLUSTRATIVE EMBODIMENT

In the embodiment shown, the focusing reflectors 11 and 13 and the planar reflectors 12 and 14 form the primary ring resonator. Disposed within the primary ring resonator is the active medium, illustratively a helium-neon mixture, contained in the tube 17. The tube 17 has Brewster-angle end windows 18 and 19 and is encircled by the band-type electrodes 20 through which radiofrequency pumping energy is supplied by the source 21 in order to excite the gas mixture and produce amplification by stimulated emission of radiation.

It is to be understood, however, that the invention can be practiced with liquid or solid state media as well as with gaseous media of different compositions. Furthermore, the excitation shown in the drawing can be of the direct-current type, if appropriate.

An auxiliary ring resonator is formed by the partially transmitting planar reflectors 15 and 16 in combination with reflectors 12 and 13. Inasmuch as the reflectors 15 and 16 are partially reflective as well as partially transmissive and are oriented at oblique incidence with respect to the path of the radiation in the primary ring resonator, they may be termed beam splitters. It should be noted that they are independent in the sense that they need not be oriented at like angles with respect to the light propagation path in the primary ring resonator so long as they form a closed light propagation path within the auxiliary ring resonator, in cooperation with the reflectors 12 and 13. It will also be noted that all legs but one of the light propagation path in the auxiliary resonator coincide with portions of legs of the primary resonator. The preferred reflectivity for reflectors 15 and 16 is about 60 percent for a tube gain of about 10 percent, assuming dimensions appropriate for the 6,328-angstrom unit neon transition.

The reflector 14 may illustratively be made partially transmissive in order to facilitate the abstraction of an output from the ring laser; or, alternatively, the light reflected from reflector 15 or 16 may be employed as an output. In some applications, outputs may be abstracted at all of these points.

In operation, the auxiliary resonator discriminates against unwanted longitudinal modes of the primary ring resonator. Specifically, the discrimination is effected by several principles of cooperation.

First, the free spectral range of the auxiliary resonator is larger than that of the primary ring resonator and preferably is also larger than the natural line width of the laser active medium which, for illustration, we have taken to be neon. The free spectral range of a resonator is the frequency spacing between adjacent resonant longitudinal modes of the resonator. Free spectral range is inversely related to the radiation path length in the resonator. The natural line width of the active medium is a frequency range throughout which oscillation can be maintained by means of appropriate tuning of the resonator. In brief, the auxiliary resonator will typically have only one resonant mode at a frequency that is supportable both by the primary ring resonator and the active medium.

Second, the auxiliary ring resonator discriminates against modes not resonant in both resonators by reflecting any radiation occurring in such modes out of the laser at reflectors 15 and 16. A large percentage of such radiation is reflected out of the laser so that such modes do not build up in the laser resonators. Because these modes do not reach oscillation level, the radiation leaving the laser at reflectors 15 and 16 will largely consist of the desired mode that is resonant in both resonators, even though only a relatively small fraction of it is coupled out, as will be explained below.

It is the action of reflectors 15 and 16 in reflecting radiation in unwanted modes out of the laser while also helping to form the auxiliary ring resonator that can give a ring laser according to this invention superior mode selectivity and greater adaptability, as compared to the configurations of the above-cited copending application of W. W. Rigrod. The reflectivities of beam splitters 15 and 16 can be variously selected to give a laser mode selectivity anywhere in a relatively wide range.

It can readily be appreciated that selectivity among modes depends upon the ratio of loss for the selected mode (preferably low loss) to the loss for the unwanted modes (preferably high loss). The loss for the selected mode is kept very low by using high quality mirrors with small scattering and absorption losses. The auxiliary resonator, being resonant for the selected mode, builds up a very high internal light intensity in that mode. There is a comparably high light intensity in that mode in the remaining portion of the primary ring resonator.

Consider what happens if portions of this light coming from below beam splitter 15 and from the left of beam splitter 15 propagate out of the laser in the upward direction. The interference between these two waves of comparable intensity is destructive because of the 180 phase shift of the latter wave upon reflection from beam splitter 15 and greatly reduces the fraction of the energy of the selected mode that is directed out of the laser by the reflective surfaces of reflectors 15 and 16. Further, there are two reflectors providing such cooperation. Reflector 15 operates upon the modes propagating in the clockwise sense in the primary ring resonator to produce the high-loss ratio, and the reflector 16 operates upon the modes propagating in the counterclockwise sense in the primary ring resonator to produce the high-loss ratio.

In order to maximize the interference effects at the beam splitters, it is desireable that the wavefront curvature and size of the interfering beams be matched as closely as possible. Illustratively, the curvatures of reflectors 14 and 13 are selected with this objective in mind.

Some interference coupling will also occur for unwanted modes close to the resonances; but this effect falls off rapidly with frequency deviation from the resonances, so that the proportion of light of most unwanted modes reflected out of the laser is determined by the reflectivities of the beam splitters. For good selectivity, the beam splitter reflectivities should be increased as the laser gain is increased.

It should be apparent that other configurations could employ polygons other than quadrilaterals so long as a portion of the path length of the auxiliary ring resonator overlaps a portion of the path length of the primary ring resonator and there are at least two beam splitters coupling the auxiliary ring resonator to the primary ring resonator. These beam splitters should be oriented to direct out the laser modes that are not resonant in both resonators.

I claim:

1. A ring laser comprising a primary ring resonator, an active medium disposed in said primary ring resonator for the emission of coherent radiation, and an auxiliary ring resonator including two independent beam splitters coupling said auxiliary ring resonator to said primary ring resonator, said beam splitters being oriented to direct out of said laser modes that are not resonant in both of said resonators.

2. A ring laser according to claim 1 in which the primary ring resonator comprises a plurality of reflectors forming a light propagation path essentially in the shape of a first closed polygon and the auxiliary ring resonator comprises a second plurality of reflectors including the beam splitters and at least one of said first plurality of reflectors, the second plurality of reflectors forming a light propagation path essentially in the form of a second closed polygon having a plurality of sides that coincide with portions of sides of said first closed polygon.

3. A ring laser comprising a primary ring resonator including a plurality of reflectors forming a closed light transmission path, an active medium disposed in said primary ring resonator for the emission of coherent radiation, and an auxiliary ring resonator including in common with said primary ring resonator a plurality of said reflectors, said auxiliary ring resonator further including two partially transmissive reflectors disposed in said light transmission path, said partially transmissive reflectors being oriented to form a closed optical path within said auxiliary resonator and to direct out of the laser those modes that are not resonant in both of said resonators.

4. A ring laser according to claim 3 in which the partially transmissive reflectors are oriented to direct out of the laser oppositely propagating modes respectively that are not resonant in both of the resonators.